(12) United States Patent
Berberich

(10) Patent No.: US 7,050,587 B1
(45) Date of Patent: *May 23, 2006

(54) SECURITY DEVICE FOR GUARDING A VEHICLE

(75) Inventor: Reinhold Berberich, Frankfurt (DE)

(73) Assignee: Mannesmann VDO AG, Frankfurt (DE)

( * ) Notice: Subject to any disclaimer, the term of this patent is extended or adjusted under 35 U.S.C. 154(b) by 814 days.

This patent is subject to a terminal disclaimer.

(21) Appl. No.: 09/644,390

(22) Filed: Aug. 22, 2000

(30) Foreign Application Priority Data

Aug. 31, 1999 (DE) .................. 199 41 346

(51) Int. Cl.
*H04L 9/00* (2006.01)
(52) U.S. Cl. ...................................... 380/262
(58) Field of Classification Search .............. 380/262; 340/426.1
See application file for complete search history.

(56) References Cited

U.S. PATENT DOCUMENTS

| | | | | |
|---|---|---|---|---|
| 5,291,516 A | * | 3/1994 | Dixon et al. ............... | 375/131 |
| 5,592,179 A | * | 1/1997 | Windyka .................... | 342/372 |
| 5,661,804 A | * | 8/1997 | Dykema et al. ............. | 380/274 |
| 5,708,712 A | * | 1/1998 | Brinkmeyer et al. ........ | 713/181 |
| 5,812,051 A | * | 9/1998 | Talbot et al. ........... | 340/426.12 |
| 5,844,990 A | * | 12/1998 | Kokubu et al. ............. | 380/262 |
| 5,898,230 A | | 4/1999 | Bartel | |
| 5,959,540 A | * | 9/1999 | Walter ....................... | 340/5.64 |
| 6,043,752 A | * | 3/2000 | Hisada et al. .............. | 340/5.26 |
| 6,317,035 B1 | * | 11/2001 | Berberich et al. ..... | 340/426.13 |
| 6,323,566 B1 | * | 11/2001 | Meier ........................ | 307/10.2 |
| 6,329,909 B1 | * | 12/2001 | Siedentop et al. ..... | 340/636.19 |
| 6,342,844 B1 | * | 1/2002 | Rozin ........................ | 340/933 |
| 6,469,616 B1 | * | 10/2002 | Lindner et al. ............ | 340/5.26 |

FOREIGN PATENT DOCUMENTS

| | | |
|---|---|---|
| EP | 0802497 | 10/1997 |
| EP | 0926021 | 6/1999 |
| GB | 2288261 | 10/1995 |
| GB | 2310300 | 8/1997 |
| GB | 2311155 | 9/1997 |
| GB | 2332548 | 6/1999 |

* cited by examiner

*Primary Examiner*—Ayaz Sheikh
*Assistant Examiner*—Pramila Parthasarathy
(74) *Attorney, Agent, or Firm*—Martin A. Farber

(57) ABSTRACT

In a device for actuating a security device, preferably for securing a motor vehicle against unauthorized use, in which a control unit transmits a first coded electromagnetic signal (stimulus signal), in which a portable transmitter (radio key) receives the stimulus signal and transmits a second coded signal (enable signal), and in which the control unit is connected to the security device and actuates the latter if the enable signal is received and recognized, both the control unit and the radio key can alter the carrier frequency of the coded electromagnetic signals. During signal transmission, this frequency is altered in a manner which is known only to the control unit and to the radio key.

4 Claims, 1 Drawing Sheet

SECURITY DEVICE FOR GUARDING A VEHICLE

FIELD AND BACKGROUND OF THE INVENTION

The invention relates to a device for actuating a security device, preferably for securing a motor vehicle against unauthorized use, in which a control unit has means for transmitting a first coded electromagnetic signal (stimulus signal), in which a portable transmitter (radio key) has means for receiving the stimulus signal and for transmitting a second coded signal (enable signal), and in which the control unit is connected to the security device and actuates the latter if the enable signal is received and recognized.

Such radio keys are used today for unlocking the doors of motor vehicles without contact, for example. They are known from WO 92/18732, for example.

If the steady-state transmission and reception frequencies for such conventional systems are known, relatively simple transceivers can also forward the stimulus signal over relatively long distances from the vehicle to the authorized user and hence stimulate a key. If appropriate transmitters and receivers are also used for transmitting back the response signal, the response signal can also be traced back to the vehicle and used for unauthorized access to the vehicle.

SUMMARY OF THE INVENTION

The object of the present invention is to provide a device for conveniently and contactlessly actuating security devices, in particular the central locking system and immobilizer in motor vehicles, which makes such unauthorized access virtually impossible.

The invention achieves this object wherein both the control unit and the radio key have means for altering the carrier frequency of the coded electromagnetic signals and that they alter this frequency during signal transmission in a manner which is known only to the control unit and to the radio key. On account of the only very short total transmission time, changing the carrier frequency makes it virtually impossible to monitor the signals and misuse them for unauthorized opening of the security device.

In a first refinement of the invention, the radio key has a narrowband transmitter whose transmission frequency can be controlled, and the radio key alters its transmission frequency over intervals of time when transmitting signals. In addition, the control unit has a tunable narrowband receiver having the same frequency range as the transmitter in the radio key.

In a further refinement of the invention, the manner in which the carrier frequency is to be changed is contained in the stimulus signal as a coded information item for transmission to the radio key.

In this context, provision may be made for the stimulus signal to contain a random number and for the carrier frequencies to be determined by applying a cryptoalgorithm to this stimulus signal and, in this context, particularly to the random number contained in the stimulus signal.

In order to ensure that both the radio key and the control unit change over rapidly to the next carrier frequency in each case, a next refinement of the invention provides for the carrier frequency selection at the receiver and transmitter ends to be determined, using the coded information item in the stimulus signal, by means of a cryptographic method in the radio key and in the control unit independently of one another. Since the necessary information item is produced at both ends in parallel, there is no need for this information item to be transmitted between the control unit and the radio key.

As a basis for generating the separate carrier frequencies for this frequency hopping, the same cryptoalgorithm can be used as for normal message authentication. In this context, the authentication component of the enable signal is at the same time the basis for selection of the discrete carrier frequencies. This has the advantage that no additional computation time need be taken up for generating this data.

In a further refinement of the invention, the signal transmission takes place over a spectrum of different carrier frequencies and the enable signal contains a coded information item for modulating this spectrum. The use of this spread spectrum transmission likewise makes signal transmission very secure.

In this context, the authentication component (for example) of the enable signal can be used as a basis for producing the spread spectrum modulation sequence. In this case, all advantages in terms of computation time taken up etc. are retained. The fact that the present and further spectral distribution of the transmitted signal is known at the transmission and reception ends means that, additionally, the otherwise necessary synchronization or locking on between the transmitter and the receiver is eliminated in the spread spectrum method.

BRIEF DESCRIPTION OF THE DRAWING

Illustrative embodiments of the invention are shown in the drawing with the aid of a plurality of figures and are explained in more, detail in the description below. In the figured of the drawings.

In the figures, identical parts are provided with identical reference symbols.

DETAILED DESCRIPTION OF THE PREFERRED EMBODIMENT

Figure 1:
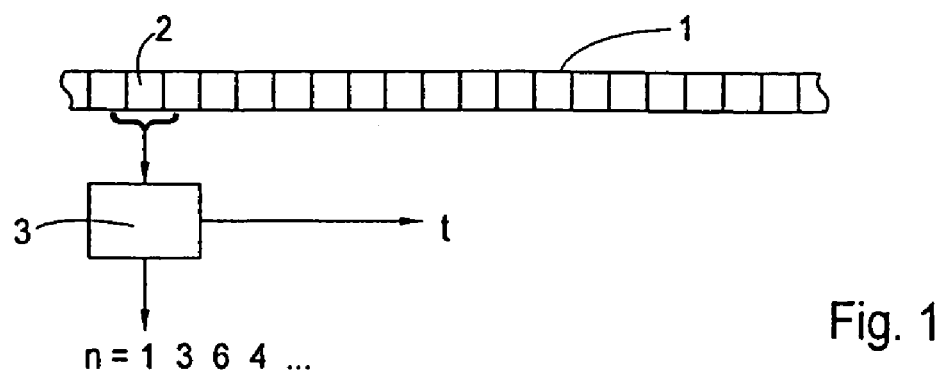
FIG. 1 shows a schematic diagram for deriving transmission channels from a stimulus signal.

FIG. 1 sows how a radio key uses the stimulus signal 1 (challenge signal) transmitted by the control unit to determine the sequence of transmission channels n which are to be used and are known at both ends for transmitting signals.

To this end, the stimulus signal 1 is loaded into a ring buffer and is passed through a cryptoalgorithm 3 in steps. The cryptoalgorithm 3 forwards the data stream, comprising bits, in the stimulus signal 1 after a particular volume of data or after a particular time t and thus generates as the result the transmission channel which is to be used for the next transmission sequence. The same procedure also takes place in parallel in the control unit, but in this unit the next reception channels in each case are determined as the result.

The rapid, narrowband changeover cycle, which cannot be anticipated by outsiders, for the carrier frequency makes it impossible to use a single relay radio link to gain unauthorized access to a vehicle.

Figure 2:
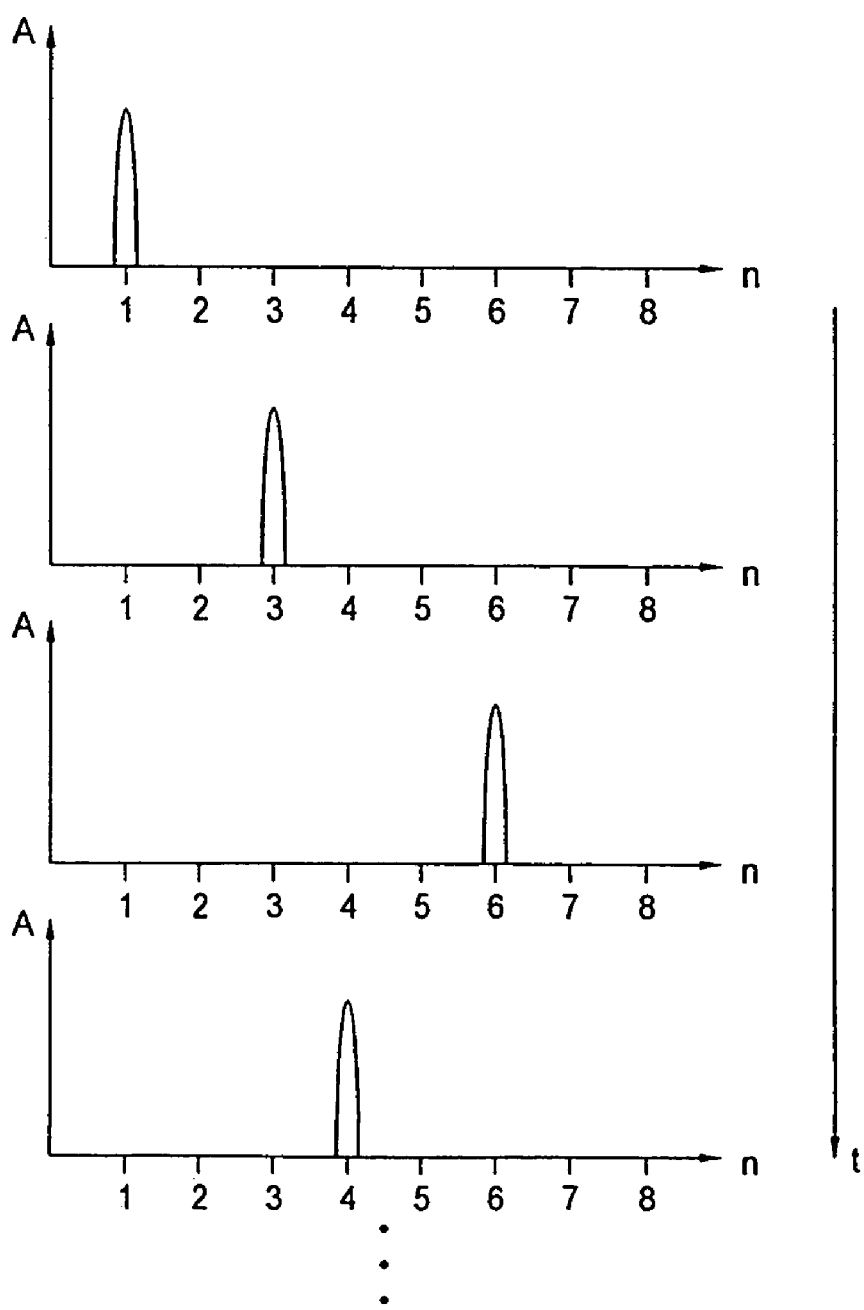
FIG. 2 shows graphs of the resultant transmission spectra.

FIG. 2 shows the resultant transmission spectra (A=amplitude) for the radio key when its enable signal is transmitted. Whenever a particular time t or a particular number of data bits has passed, there is a changeover to another channel on the basis of the previously determined sequence. The control unit likewise changes over its reception device synchronously, so that rapid data transmission is assured.

I claim:

1. A device for actuating a security device, preferably for securing a motor vehicle against unauthorized use, comprising: a control unit for actuating the security device, the control unit having means for transmitting a first coded electromagnetic signal (stimulus signal); a portable transmitter (radio key) having means for receiving the stimulus signal, and means for transmitting a second coded electromagnetic signal (enable signal) on a carrier frequency determined from the stimulus signal by the radio key; and wherein the control unit has a receiver tuned to the carrier frequency and actuates the security device if the enable signal is received by the receiver of the control unit and is recognized by the control unit, wherein the control unit and the radio key have means respectively for tuning said receiver of the control unit to said carrier frequency and for altering said carrier frequency of the second coded electromagnetic signal provided by the transmitting means of the radio key; and wherein the radio key alters said frequency and the control unit correspondingly tunes its receiver during signal transmission in a manner known only to the control unit and to the radio key; a manner in which the carrier frequency is to be changed is contained in the stimulus signal (1) as a coded information item for transmission to the radio key; and the stimulus signal (1) contains a random number and the carrier frequencies are determined by applying a cryptoalgorithm (3) to said stimulus signal (1) and, in this context, particularly to the random number contained in the stimulus signal (1); and wherein the signal transmission takes place over a spectrum of different carrier frequencies and wherein the enable signal contains a coded information item for modulating said spectrum; and wherein the transmission via different carrier frequencies constitutes frequency hopping.

2. The device as claimed in claim 1, wherein the radio key has a narrowband transmitter, transmission frequency of which is controllable and wherein the radio key alters its transmission frequency over intervals of time when transmitting signals.

3. The device as claimed in claim 2, wherein the tunable receiver of said control unit is a tunable narrowband receiver having the same frequency range as the transmitter in the radio key.

4. The device as claimed in claim 1, wherein selection of the carrier frequency at the receiver and transmitter ends is determined, using a coded information item, which includes said random number, in the stimulus signal, by means of a cryptographic method, operative with said cryptoalgorithm, in the radio key and in the control unit independently of one another.

* * * * *